United States Patent
Dutta et al.

(10) Patent No.: US 7,319,689 B2
(45) Date of Patent: Jan. 15, 2008

(54) METHOD FOR HANDLING THE SIMULTANEOUS MOBILITY OF MOBILE HOSTS IN INFRASTRUCTURE-BASED NETWORKS

(75) Inventors: Ashutosh Dutta, Bridgewater, NJ (US); Kuok-Shoong Daniel Wong, Kelana Jaya Selengor (MY); Kenneth Young, Denville, NJ (US); Henning Schulzrinne, Leonia, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 273 days.

(21) Appl. No.: 11/248,743

(22) Filed: Oct. 12, 2005

(65) Prior Publication Data

US 2007/0242628 A1 Oct. 18, 2007

Related U.S. Application Data

(60) Provisional application No. 60/618,044, filed on Oct. 12, 2004.

(51) Int. Cl.
*H04Q 7/24* (2006.01)
(52) U.S. Cl. ........................... 370/338; 370/349
(58) Field of Classification Search .............. 370/331, 370/338, 349; 709/238, 249; 455/435.1, 455/436, 445
See application file for complete search history.

(56) References Cited

U.S. PATENT DOCUMENTS

2001/0046223 A1* 11/2001 Malki et al. ............... 370/338
2004/0024901 A1* 2/2004 Agrawal et al. ............ 709/238
2004/0176095 A1* 9/2004 Yamada et al. ............. 455/445

* cited by examiner

*Primary Examiner*—Lee Nguyen
(74) *Attorney, Agent, or Firm*—William A. Schoneman

(57) ABSTRACT

In infrastructure-based networks devices often move from one attachment point in the network or a sub-network thereof to another attachment point. Communications sessions may be established between Mobile Hosts attached to such nodes. Communications sessions between nodes established using Session Initiation Protocol (SIP), Mobile Internet Protocol with Location Registers (MIP-LR) or Mobile Internet Protocol version 6 (MIPv6) may fail if there is simultaneous mobility of two Mobile Hosts in an ongoing communication session. Stationary binding update proxies and stationary location proxies are introduced into such communications networks in order to provide a solution to the problem of simultaneous mobility of Mobile Hosts. Specific implementation for SIP, MIP-LR and MIPv6 are provided. IN SIP networks, the SIP server for the mobile hosts acts as the stationary binding update proxy and the stationary location proxy. In MIP-LR networks, the Home Location Register (HLR) functions as the stationary binding update proxy and the intercepting is performed by the Foreign Agent or Advertisement Agent. In MIPv6 networks, the home agent of each the first and second mobile host functions as the stationary location proxy and the stationary binding update proxy for each mobile host respectively.

15 Claims, 11 Drawing Sheets

Vulnerability intervals

METHOD FOR HANDLING THE SIMULTANEOUS MOBILITY OF MOBILE HOSTS IN INFRASTRUCTURE-BASED NETWORKS

CROSS-REFERENCE TO RELATED APPLICATIONS

This application claims the benefit of U.S. Provisional Patent Application No. 60/618,044 filed on Oct. 12, 2004, the disclosure of which is hereby incorporated herein by reference.

GOVERNMENT LICENSE RIGHTS

This invention was made with Government support under MDA972-00-9-0009 awarded by DARPA. The Government has certain rights in this invention.

FIELD OF THE INVENTION

Our invention relates generally to communication between terminal devices attached at different attachment points in an infrastructure-based network. More particularly, our invention relates to a system and method for enabling terminal devices in such infrastructure-based networks to continue to communicate even though both devices move simultaneously from one attachment point to another. The present system and methods are applicable to infrastructure-based networks using Session Initiation Protocol (SIP), Mobile Internet Protocol with Location Registers (MIP-LR) and Mobile Internet Protocol version 6 (MIPv6).

DESCRIPTION OF THE BACKGROUND

Simultaneous mobility is the special case when two end (or terminal) hosts (Mobile Hosts) in a communications session through a network are mobile and both move from one attachment point in the network to another at or about the same time. Although it may not be typical (more typical would be the case when one of the two hosts moves and the other hosts within the network remain stationary during that time), such an event will occur in infrastructure-based networks and this must be handled properly by mobility protocols. This simultaneous mobility problem results in the loss of to a binding update from one Mobile Host because it is sent to a previous address of the other Mobile Host that is also moving at around the same time.

Two Mobile Hosts attached to attachment points nodes in an ad hoc network are in a "communication session" if they are actively exchanging data. A communication session may be in a "normal state" or an "interrupted state." A session is in a normal state when data from one Mobile Host is arriving at the right location for the other Mobile Host, and vice versa. It is in an interrupted state otherwise.

A handoff is a movement of a Mobile Host from a previous attachment point to a new attachment point. The "handoff time" is the moment in time when it changes from being reachable at the previous attachment point to being not reachable at the previous attachment point. Given that time is continuous, it is assumed that only one handoff can occur at any given moment in time, i.e, that handoff times are unique. Two handoffs are consecutive if neither of the Mobile Hosts performs another handoff in between the two handoffs. Consecutive handoffs can be at the same mobile host or between two different mobile nodes.

FIG. 13 depicts the simultaneous mobility of two mobile hosts 1300 and 1305 in an infrastructure based network. The example network in FIG. 13 is comprised of backbone routers 1310a, 1310b and border routers 1320a-g, 1340a-d, 1360a-d and 1380a-f in each of four border domains. At the edge of each border domain attachment points 1330a-e, 1350a-e, 1370a-f and 1390a-e permit mobile hosts 1300 and 1305 to attach. The simultaneous mobility problem arises when mobile host 1300 moves from attachment point 1330a to attachment point 1350b in domain2 for example while at the same (or nearly the same) time mobile host 1305 moves from attachment point 1390b to attachment point 1370a. The binding update information that must be passed between mobile host 1300 and mobile host 1305 will not reach the other prior to their movement.

A binding update is information about the location of the sending Mobile Host. A binding update is "lost" if it does not arrive at its intended recipient Mobile Host. A binding update makes a "belated arrival" if it arrives at a network where the destination address used to be valid for the intended recipient Mobile Host but it is no longer valid at the moment of arrival. A binding update is "lost through belated arrival" if it makes a belated arrival and is consequently lost. Binding updates do not contain information about future moves of the sending Mobile Host. While two Mobile Hosts are in a communication session, they get information on the location of the other Mobile Host only from binding updates. In other words, they do not actively seek the location of the other Mobile Host, but only passively accept binding updates. Binding updates are sent directly to the most current known address (known by the sender) of the intended recipient Mobile Host. In general, the latency for binding updates to arrive is assumed to be much smaller than the average inter-handoff time, therefore, it is extremely unlikely that a binding update would be sent and the recipient Mobile Host would move twice before the binding update arrives at the previous network of the recipient.

Standard Mobile Internet Protocol (MIP) does not have a problem with simultaneous mobility. By design, non-moving Correspondent Hosts are unaware of the mobility of Mobile Hosts. The home agent of the Mobile Host functions as an anchor point for the Mobile Host. No matter where the Mobile Host moves, packets for it always go first to its home network for interception and tunneling by its home agent. If it turns out that the Correspondent Host is also mobile, it will also have a home agent and packets from the Mobile Host will similarly be intercepted and tunneled to the appropriate network by its home agent. Since both home agents are stationary and can always be reached through IP routing simultaneous mobility does present a problem to MIP. The standard MIP protocol, however, does not have the survivability features of SIP, MIP-LR or MIPv6. There has been suggestion to extend TCP migration mobility protocol to handle simultaneous mobility, but there are significant differences between the TCP migration schemes (where mobility is handled at the transport layer) and MIP-related or SIP that can be taken care of at the application layer.

Session Initiation Protocol (SIP) is a protocol that enables setting up voice calls, two-way multimedia sessions, teleconferencing, instant messaging and other types of communication using the Internet. SIP is a protocol in the Application Layer of the OSI Reference Model to enable the establishment, management and termination of such real-time communications sessions over an Internet Protocol (IP) network. SIP is defined by RFC 3261 of the Internet Engineering Task Force (IETF). SIP negotiates the features and capabilities of a communication session at establishment of the session reducing time necessary for setting up communication sessions. Mobility of the end host is handled very naturally by SIP using existing SIP signaling mechanisms. For example, to initiate a session, the SIP "INVITE" message is sent by the initiating device to the other device. The extension of SIP to handle mid-session mobility specifies that when one of the two devices moves, it sends a re-INVITE message to the other device, informing it of its new location (e.g., its new IP address). In addition to the re-INVITE message sent directly to the device that moved (Mobile Host) to the other device (Correspondent Host), the Mobile Host also registers its presence in the new network with a SIP server in its home network. This allows other potential Correspondent Hosts to find the Mobile Host.

FIG. 1 depicts the movement of a Mobile Host from one "foreign" network to another. Mobile Host 112 moves from foreign subnet 110a to foreign subnet 110b which are both away from the home network 100 where the SIP server 102 for Mobile Host 112 resides. Corresponding Host 122 resides in subnet 120. Step 1 (each step is indicated by the lines with arrows and bold single digit reference numerals) is the movement of Mobile Host 112 from subnet 110a to subnet 110b. After movement to a new subnet the Mobile Host 112 sends a re-INVITE message to Corresponding Host 122 at step 2. At step 3, Corresponding Host 122 sends a SIP OK message to Mobile Host 112. Mobile Host 112 and Corresponding Host 122 can then exchange data at step 4. At step 5 the relocated Mobile Host registers with the SIP Server 102 at its home network 100.

FIG. 2 is a diagram depicting the flow of data resulting from a mishandling of simultaneous mobility in SIP. In the basic SIP mobility scheme, when a Mobile Host moves to a new network, it sends a re-INVITE message to the Correspondent Host, as well as a REGISTER message to its home network SIP server. There are two options for the part of the re-INVITE, i.e., it could go through the inbound proxy of the Correspondent Host, or it could go directly to the Correspondent Host. This second option will not work properly if there is simultaneous mobility of the Mobile Host and the Correspondent Host. Clearly, if the Correspondent Host moves at the same time, the re-INVITE may be lost (and similarly, the re-INVITE from the Correspondent Host to the Mobile Host could also be lost). As the home SIP severs for both are stationary and always reachable through IP routing, the registrations are not affected by simultaneous mobility. It would appear the both hosts could now obtain the new location of the other party through the SIP servers, analogous to how the home agent provides such information in MIP. However, in MIP, the home agent quickly discovers that the Correspondent Host needs the updated binding information, because data packets from the Correspondent Host are routed to the home network and intercepted by the home agent. In the SIP case, on the other hand, the Correspondent Host may not immediately contact the SIP sever. Instead the re-INVITE may time-out and may be tried again several more times to the wrong network by virtue of its built-in retransmission mechanism. The crucial difference is that the data path and signaling path are separate in the case of SIP, unlike that of MIP. For simplicity, automatic retransmissions of lost re-INVITE messages are not shown and neither are messages like ACK that acknowledge the SIP OK.

Simultaneous mobility of two end-hosts is not usually an issue for pre-session mobility in SIP. However, during a transition before a SIP session set-up is complete, simultaneous mobility may present problems. As shown in FIG. 3, it may so happen that one of the signaling messages (IN-VITE, OK, ACK) does not reach the other party and gets lost, despite the SIP server keeping an up-to-date registration for both parties.

Mobile IP with Location Registers (MIP-LR) is an extension of the Mobile IP protocol. Mobile IP is an extension to basic Internet Protocol (IP) intended to serve mobile users of IP devices (known as Mobile Hosts) enabling them to roam across networks and geographies while remaining connected as if attached to the home location of the Mobile Host device. In Mobile IP a Mobile Host has one permanent address for identification and acquires a temporary card-of-address (COA) for routing purposes. Data is transmitted to the permanent address associated with the Mobile Host device. When the Mobile Host device is away from its permanent address the "home agent" at the permanent address forwards the data packets in care of the "foreign agent" by encapsulating the data with another IP address contained in a data header preceding the original packet. Upon receipt of the data packets by the "foreign agent" the additional header is removed through a "decapsulation" process. If the device relocates again, the "home agent" and the current "foreign agent" are notified and packets en route can be rerouted to a new "foreign agent" through a process known as "smooth handoff." MIP requires registration messages be exchanged with a home agent on a Mobile Host's home network whenever the Mobile Host moves between subnets in foreign networks, to ensure that the home agent can tunnel packets destined for the Mobile Host to the right foreign agent in the foreign subnet. With MIP, all packets sent to the Mobile Host have to pass through the home agent, making the home agent a single point of failure. This is a serious problem for networks that require high levels of robustness and survivability.

In Mobile IP with Location Registers (MIP-LR) the sender first queries a database called a Location Register (or Home Location Register) in order to obtain the current location of the recipient device or Mobile Host. MIP-LR was designed for use in tactical military environments, enterprise environments and within logical administrative domains because it requires that a sending host be aware which host implements the MIP-LR protocol. MIP-LR is interoperable with MIP. Hosts that implement only MIP can continue to operate but will not gain the benefit of MIP-LR.

In MIP-LR, when a Mobile Host moves from one subnet to another, it registers its current forwarding care-of-address (COA) with a database called a Home Location Register (HLR). When a Correspondent Host has a packet to send, it first queries the HLR to obtain the COA of the Mobile Host and then the Corresponding Host sends the packet directly to the Mobile Host. Mapping from the Mobile Host's permanent IP address to its COA is done by the IP layer at the Correspondent Host and is transparent to higher-layer protocols. The reverse mapping is done at the Mobile Host. The Correspondent Host caches the Mobile Host's COA to avoid querying the HLR for every subsequent packet destined for the Mobile Host. The Mobile Host maintains a list of Correspondent Hosts with which it is in active communication and informs them if it moves to a different subnet as is done in Mobile IP. Unlike the home agent in MIP, a home location register need not necessarily be located in the home network and it can be replicated for survivability. FIG. 4 is a diagram depicting mobility of a Mobile Host in a network employing MIP-LR. At step 1 Mobile Host 412 connected to foreign subnet 410 which has a visitors location register (VLR) 460 associated with it resisters its care-of-address (COA) with its HLR 450 associated with its home network 400. At step 2 the Corresponding Host 422 queries the HLR

450 to find the current COA for Mobile Host 412. At step 3 the HLR sends the COA for Mobile Host 412 to Corresponding Host 422. At step 4 the Corresponding Host caches the COA of the Mobile Host and at step 5 the Corresponding Host sends un-encapsulated data packets directly to the COA for the Mobile Host.

FIG. 5 is a diagram depicting the flow of data resulting from simultaneous mobility in networks implementing MIP-LR. The problem that MIP-LR faces with simultaneous mobility are analogous to the problems faced by SIP with simultaneous mobility when SIP re-INVITES are sent to mobile Correspondent Hosts. When a Mobile Host moves to a new network, it sends a MIP-LR update message to the Correspondent Host, as well as a MIP-LR update to its Home Location Register (HLR). Clearly, if the Correspondent Host moves at the same time, the direct MIP-LR update may be lost (and similarly, the direct MIP-LR update from the Correspondent Hosts to the Mobile Host could also be lost). Since the HLR's for both hosts are stationary and always reachable through IP routing, the registrations should not be affected by the simultaneous mobility. However, like in the SIP case described above, the Correspondent Host may not immediately query the HLR and both hosts will be using out-dated IP addresses for each other.

Another issue of simultaneous mobility arises with respect to MIPv6 the extension of MIPv4. Mobile IP (MIPv4) is the dominant mobility-handling protocol for host mobility on the Internet. However, with the rise of Internet Protocol version 6 (IPv6), a new mobility-handling protocol was needed for host mobility on IPv6 networks. The new protocol, proposed by the Internet Engineering Task Force (IETF) is Mobile IPv6 (MIPv6). Among the new features introduced with MIPv6 is route optimization (MIPv4 also had a way to do route optimization, but route optimization for MIPv4 was always a "draft-stage" add-on and never part of the main MIPv4 specifications). Route optimization has its benefits, but a major problem is that it makes MIPv6 vulnerable to the simultaneous mobility problem. Since 3G wireless specifications groups are moving towards IPv6, and beyond-3G systems are even more likely to use IPv6, the vulnerability of MIPv6 to the simultaneous mobility problem becomes a critical issue.

Directly providing binding updates from the Mobile Host to the Corresponding Host pose a security problem. In the case of the home agent, it is reasonable to stipulate that the Mobile Host and home agent should have an IPsec security association, but it is not reasonable to stipulate the same between the Mobile Host and every potential Corresponding Host. The solution adopted in MIPv6 is to use the so-called "return routability" procedure. This allows the Mobile Host and Corresponding Host to set up a shared key in a "reasonably" secure manner.

Because timing is so important in analyzing the simultaneous mobility problem in MIPv6, there is a need to review the exact sequence of events that happens whenever a Mobile Host moves to a new foreign network. The typical sequence of events is as follows. In step 1, (if handing off from a previous network) the Mobile Host stops being reachable at the previous network. In step 2, the Mobile Host obtains a new care-of-address at the new foreign network. The Mobile Host initiates registration of its new care-of-address with its home agent at step 3. At step 4, the Mobile Host performs correspondent registration procedure with all its Correspondent Hosts (except those from which it may wish to keep its topographical location private). Registration with Correspondent Hosts consists of two sequential parts. First the return routability procedure is performed and then the authenticated binding update is sent using the shared key generated during the latest return routability procedure.

The Mobile Host must initiate registration of its new care-of-address with its home agent (by sending a Binding Update to the home agent) before it may perform any correspondent registration procedures related to the new care-of-address. However, it does not need to wait to see if the registration with the home agent is successful before performing correspondent registrations. The correspondent registration procedure, as specified by RFC 3775, always includes a return routability procedure before sending of binding updates to a Correspondent Host. This implies a Mobile Host that moves fast between foreign networks would have to go through a long correspondent registration procedure with each of its Correspondent Hosts every time it moves. This could be fairly disruptive to the packet flows from Correspondent Host to Mobile Host. However, RFC 3775 does specify an optional expedited return routability procedure.

In the return routability procedure, the Mobile Host sends two messages to the Correspondent Host; these are the Home Test Init and the Care-of Test Init messages. The Home Test Init is reversed tunneled to the home agent from the Mobile Host, and then forwarded by the home agent to the Correspondent Host. The Care-of Test Init is sent directly to the Correspondent Host. The Correspondent Host responds by sending a Care-of Test message directly to the Mobile Host, addressed to its care-of address, and by sending a Home Test message indirectly to the Mobile Host, addressed to its home address. The Care-of Test message contains the "care-of keygen token", and the Home Test message contains the "home keygen token."

The care-of keygen token and home keygen token are hashed together to form the "binding management key", a shared secret key that can be used by the Mobile Host to send a binding update to the Correspondent Host. The Correspondent Host is the only node that can generate the care-of and home keygen tokens, since the generation of these tokens involves the "node key" of the Correspondent Host, where the node key is a secret key never shared with anybody, and whose value changes from time to time. Because the tokens are sent to the Mobile Host by two paths, it is most likely that only the Mobile Host would know both tokens. Thus, only the Correspondent Host and the Mobile Host can generate the correct binding management key, which is used to authenticate binding updates from the Mobile Host to the N to Correspondent Host.

RFC 3775 does not allow an Mobile Host to perform return routability once, generate the binding management key, and then re-use the key for subsequent binding updates (and furthermore, the correspondent registration procedure for each Correspondent Host proceeds independently, each with their own binding management key). Instead, a new binding management key must be derived each time a Mobile Host moves. However, RFC 3775 allows for an expedited process for deriving the key—a recent home keygen token can be re-used, with a new care-of keygen token.

In the expedited process, only a new care-of keygen token needs to be obtained, so the return routability procedure then consists of a Care-of Test Init message from the Mobile Host to the Correspondent Host, and the care-of keygen token being sent in response directly to the new care-of-address, in the Care-of Test message. This is expected to reduce correspondent registration latency in some cases, especially where the roundtrip through the home agent (for the Home Test Init and Home Test messages) may be significantly larger than the roundtrip directly between Mobile Host and Correspondent Host.

A problem arises when both the Mobile Host and the Correspondent Host are both mobile at the same time. When a Mobile Host moves to a new foreign network prior to, and including, step 4 (initiation of registration with the home agent), any movement of the other node does not matter. However, when it comes to step 4 (correspondent registration), the situation changes. Correspondent registration depends for its success upon messages reaching the other node. If the other node moves any time before receiving the binding update, one or more messages may be lost and the correspondent registration procedure may therefore fail. The messages lost may be during the return routability phase or after it. Two different cases are possible. First where messages are lost during the return routability procedures and secondly, where messages are lost after the return routability procedure.

In the first case, the two hosts are referred to as Mobile Host A and Mobile Host B. Mobile Host A moves, initiates home agent registration, and then initiates the return routability procedure with Mobile Host B. One or both of the Home Test Init and Care-of Test Init messages may be lost because of simultaneous movement by Mobile Host B. Now consider what happens to the correspondent registrations that Mobile Host B wishes to initiate with its Correspondent Hosts. Without receiving both the Care-of Test Init and Home Test Init from Mobile Host A, Mobile Host B will not update Mobile Host A's address in its cache, so Mobile Host B will send its Care-of Test Init and Home Test Init messages to Mobile Host A's old care-of-address. More precisely, Mobile Host B will send its Care-of Test Init message directly to Mobile Host A's old care-of-address, and reverse tunnel its Home Test Init to its home agent which will then forward it to Mobile Host A's old care-of-address. Thus, Mobile Host B will be unable to proceed with its own return routability procedure.

Basically, the scenario is that one of the Mobile Hosts moves first (say, Mobile Host A), but by the time Mobile Host B moves a little while later, one or both of the Home Test Init messages has not yet reached Mobile Host B, so Mobile Host A's return routability procedure never completes, which implies that Mobile Host B will also be unable to complete its return routability procedure. This scenario is depicted in the diagram in FIG. 6.

Now suppose that Mobile Host B did not move so soon after Mobile Host A moved, but only moved after Mobile Host A's return routability procedure has completed. Then Mobile Host A and Mobile Host B would have the binding management key for Mobile Host A to send an authenticated binding update to Mobile Host B. However, because of Mobile Host B's movement, Mobile Host A's binding update goes to Mobile Host B's old care-of-address and is lost. Meanwhile, Mobile Host B is trying to initiate Mobile Host B's return routability procedure, but both the Home Test Init and Care-of Test Init messages go to Mobile Host A's old care-of-address, and so are lost as well. This scenario is depicted in FIG. 7.

When a standard return routability procedure has been recently performed, a Mobile Host can re-use the home keygen token sent by a Correspondent Host. Thus, only the Care-of Test Init and Care-of Test messages need be exchanged in the expedited return routability procedure. Basically, the scenario is that one of the nodes moves first (say, Mobile Host A), but by the time Mobile Host B moves a little while later, the Care-of Test Init message has not yet reached Mobile Host B, so Mobile Host A's expedited return routability procedure never completes. This implies that Mobile Host B will also be unable to complete its return routability (whether expedited or not).

Thus, it is desirable to have a solution to the simultaneous mobility problem for SIP-based, MIP-LR-based and MIPv6-based mobility management schemes, particularly one using a common approach. It would be desirable to impose minimal changes on the existing protocols while efficiently dealing with the simultaneous mobility problems. Furthermore, it would be desirable to handle both pre-session and mid-session mobility focusing on layer 3 handoffs, i.e. where IP address changes are involved.

Although an additional problem could be created by having an excessive handoff rate this is not the focus of the present invention. The present invention is aimed at finding a solution to the simultaneous mobility problem where the handoff rate of a Mobile Host is "typical" enough that consecutive handoffs of the same Mobile Host are non-overlapping. This invention does not resolve situations of overlapping consecutive handoffs of the same Mobile Host, where one handoff has not completely finished before the next begins, e.g. there has not been enough time after the acquisition of an IP address for binding updates to reach their destination networks. The problems encountered with overlapping consecutive handoffs are caused by an excessive handoff rate which is different from the problem caused by simultaneous mobility. Whether the Correspondent Host is mobile or fixed, there will be very severe problems when the Mobile Hosts changes its IP address before binding updates for its previous IP address have even arrived at their destinations. For the foreseeable future, the extreme case of handoffs rates high enough for overlapping consecutive handoffs is highly improbable.

SUMMARY OF OUR INVENTION

Accordingly, it is desirable to provide methods and systems that overcome the shortcomings of the prior art by providing a stationary location proxy and a stationary binding update proxy for use in overcoming the simultaneous mobility problem in infrastructure-based networks.

A method for maintaining a communication session exchanging data between a first mobile host connected to first attachment point in an infrastructure-based network and at least a second mobile host connected to a second attachment point in the network is provided even as the first mobile host moves to a third attachment point and the second mobile host moves to a fourth attachment point. The method sends a binding update from the first mobile host to a stationary location proxy associated with said first mobile host and a list of all hosts in communication with the first mobile host and the binding update to a stationary binding update proxy associated with the first mobile host. Likewise, a binding update is sent from the second mobile host to a stationary location proxy associated with said second mobile host and a list of all hosts in communication with the second mobile host and the binding update is sent to a stationary binding update proxy associated with the second mobile host. As a result the IP address of the fourth node is obtained from the stationary binding update proxy from the stationary location proxy of the second mobile host.

The method further comprises the step of sending direct binding updates from the first and second mobile hosts to the last known IP address of each host in communication with the first and second mobile hosts. An interceptor can be used to intercept packets destined for the first and/or second mobile host that arrive in the sub-net from which the first and/or second mobile host has moved and forwarding these packets to the sub-net to which the respective mobile host has moved.

These fundamental principles of the present invention are applied to networks implementing Session Initiation Protocol (SIP). In SIP systems the SIP server for the first mobile host functions as the stationary location proxy and as the stationary binding update proxy for incoming INVITE messages. Furthermore, the SIP server immediately re-transmits re-INVITE messages upon receiving a REGISTER message from the destination of a pending re-INVITE message rather than waiting for a time-out.

Additionally, the fundamental principles of the invention are applied to networks in which the communication sessions are established using Mobile Internet Protocol with Location Registers (MIP-LR). In such networks, the Home Location Register (HLR) functions as the stationary location proxy and the stationary binding update proxy and the intercepting in a MIP-LR network is performed by the Foreign Agent or Advertisement Agent.

Finally, the fundamental principles of the invention are applied to networks in which the communication session is established using Mobile Internet Protocol version 6 (MIPv6). In MIPv6 networks, the home agent of the each of the first and second mobile host functions as the stationary location proxy and the stationary binding update proxy for each mobile host respectively. Data traffic between the first mobile host to the second mobile host is scanned to detect binding updates and whenever a control message (binding update, home test init or care-of test init) is identified the home agent retains a copy for a time predetermined time period after which it is discarded. The home agent checks for stored control messages when a binding update arrives at the home agent of a mobile host and forwarding any such stored control messages to the mobile host. The predetermined time period is longer than the two-way time latency from the home agent to the mobile host and the time latency for the mobile host to move and obtain a new care-of address.

DETAILED DESCRIPTION OF OUR INVENTION

In a typical handoff from Mobile Host A to Mobile Host B, the first step is Mobile Host A selects a new network base station or access point. Mobile Host A begins to reconfigure the wireless interface, and at some point in time, time e, cannot be reached any longer at the old IP address. After a short time, $\gamma$, Mobile Host A has finished reconfiguring its wireless interface, and is reachable at its new IP address. Connectivity from Mobile Host B to Mobile Host A is restored, as a binding update reaches Mobile Host B directly (or reaches something like a Home Agent) from Mobile Host A.

Figure 8:
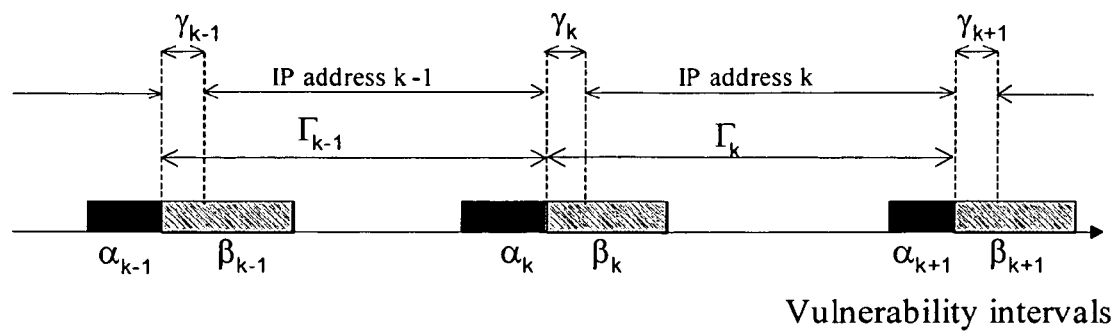
FIG. 8 is a diagram depicting the vulnerability intervals for the simultaneous mobility problem.

Referring to FIG. 8, during this handoff, there is a time interval during which Mobile Host A is vulnerable to losing binding updates that are sent to it by Mobile Host B. Although it may appear vulnerable only for time $\gamma$, the period of vulnerability may in fact be significantly longer. Suppose it takes the binding update a units of time to go from Mobile Host B to Mobile Host A and from time e it takes another length of time, $\beta$, for Mobile Host A's binding update to reach Mobile Host B. If Mobile Host B changes IP addresses and transmits its binding update any time from $e-\alpha$ to $e+\beta$, the binding update will be addressed to Mobile Host A's old IP address and will, therefore, be lost. The vulnerability interval is in fact $\alpha+\beta$. FIG. 8 illustrates this with the subscripts k−1, k and k+1 referring to the handoffs made by Mobile Host A.

The inter-handoff intervals $\Gamma_{k-1}$, $\Gamma_k$ and $\Gamma_{k+1}$ can be modeled as a Poisson distribution with mean $\lambda$. With $P_O$ used to denote the probability that at lest one out of the N handoffs in a given session (e.g., voice session between two SIP end hosts), suffers from the simultaneous mobility problem $P_N$. Then $P_N=1-(1-P_O)^N$ and $P_O \approx E[\alpha+\beta]/\lambda$.

Based on measurements, $E[\alpha+\beta]$ ranges from 50 milliseconds to 500 milliseconds, while $\lambda$ may range from 5 seconds (movement at vehicular speeds across pico cells of a few hundred meters in diameter) to 500 seconds or more (larger cells, slower speeds, non-linear movement pattern). The highest probability of simultaneous mobility is when latency is the largest and average inter-handoff time is the smallest.

For the case of simultaneous mobility during session initiation protocol (SIP) signaling, the probability of failure also depends upon the mobility rate of the mobile hosts. From laboratory measurements, it takes about 200-300 milliseconds to complete the whole session initiation sequence. A complete registration will take about 150 ms. This time, however, may vary depending on the processing power of the communicating hosts. Hence, the probability of a problem arising from simultaneous mobility during SIP signaling is non-trivial.

Solution mechanisms are specific mechanisms or function that could be used (typically in conjunction with other mechanisms/function) in a solution for the simultaneous mobility problem for a given mobility protocol. The solutions can be divided into two categories: receiver-side mechanisms and sender-side mechanisms. Receiver-side mechanisms typically can be found in the previous network or the home network of the receiver and act on behalf of a receiver to help it be reached. Sender-side mechanisms typically can be found in the home network of the sender, or in the sender itself, and act on behalf of the sender to try to reach the receiver.

The present invention generally solves the simultaneous mobility problem through the use of stationary binding update proxies and/or stationary location proxies although specific solutions for each type of protocol (SIP, MIP-LR and MIPv6) are sent forth individually below. Stationary binding update proxies act on behalf of a Mobile Host to ensure that binding updates for the current configuration of the Mobile Host are sent to the proper destinations. Stationary location proxies, on the other hand, act on behalf of a Mobile Host as repositories of the latest configuration, and can be queried for such information. Both of these proxies have the following two properties. First, they are stationary, i.e., they are not mobile. If they are mobile they could move at the wrong time and the simultaneous mobility problem could arise again similar to problems that would arise in ad-hoc networks. Secondly, they are abstract, functional elements and could be implemented in the same host (forming a stable rendezvous point), and even in existing network elements.

The method of using the stationary location proxy and stationary binding update proxy works as follows. Immediately after a handoff, the Mobile Host sends a binding update to its stationary location proxy. It then sends a list of Correspondent Hosts to its stationary binding update proxy together with the new IP address. The stationary binding update proxy is then responsible for obtaining the latest address of the Correspondent Host from the stationary location proxy of the Correspondent Host and to initiate binding updates to the correct address. To reduce update latency, direct binding updates should also be sent by the Mobile Host to the last known address of each Correspondent Host. To make the simultaneous mobility solution even more robust, an "Interceptor" function is used. The "interceptor" is from a previous network from which the mobile host has just moved. The function of the Interceptor is to intercept packets destined for the Mobile Host that arrive in network (or sub-net) from which the Mobile Host has just moved. The Interceptor then forwards these packets to the new network.

Application to SIP

In SIP, there is flexibility in the placement and usage of SIP servers in the signaling paths between two Mobile Hosts. The Record-Route field is an optional filed in the SIP header that allows SIP servers to remain in the signaling path between two SIP Mobile Hosts during a communications session. Assuming that there will be a SIP server in each Mobile Host's home network that can serve as an up-to-date location proxy for it there are two solutions.

Figure 9:
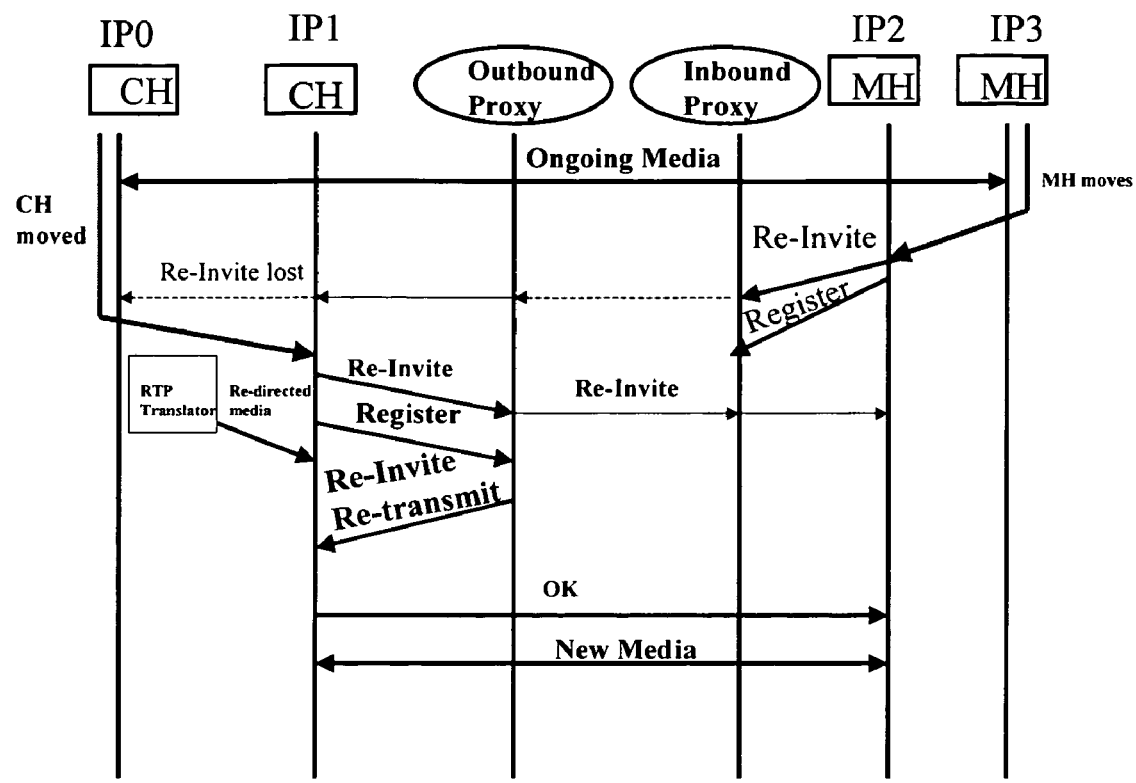
FIG. 9 is a diagram depicting the implementation of the present invention in a network using SIP.

One solution to the SIP based problem is the use of mobile-originated lost message retransmission. SIP has a built-in retransmission capability, where messages are retransmitted after a time-out if acknowledgement is not received. During mid-session mobility, a re-INVITE may get lost even if it goes through the SIP server that keeps the most recent registration status of the destination. However, SIP allows for automatic retransmissions of INVITES (including reINVITEs) by SIP user agents (UAs) if a response (OK message) is not received within a specified time. Stateful SIP servers could also retransmit (re-)INVITEs, as seen in FIG. 9. Another solution is the use of a forwarding mechanism from a previous network. A node in the previous network such as a Real-time transport Protocol (RTP) translator 910 can help redirect the traffic to the new address. FIG. 9 depicts a SIP example where the retransmissions allow the signaling to eventually be successful, while the RTP translator reduces the disruption in the data traffic flow while waiting for the retransmissions to complete. Note that the RTP translator only forwards data traffic from the previous network.

Figure 11:
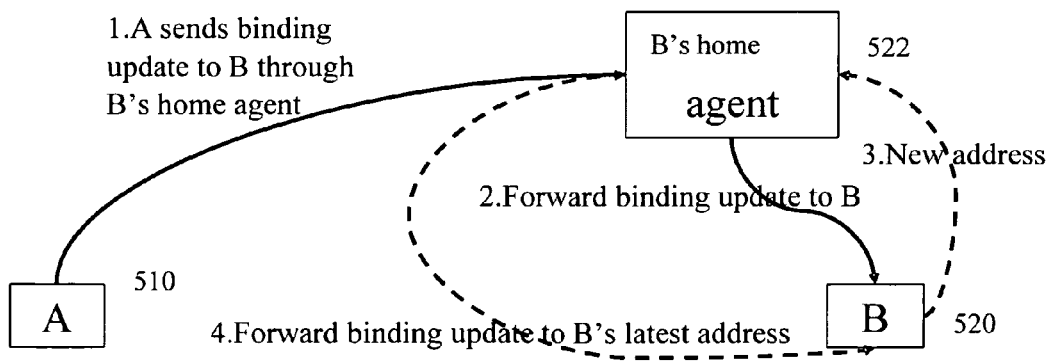
FIG. 11 is a diagram of a second embodiment of the present invention in a network using MIPv6.

A receiver-side mechanism for overcoming uses the SIP server in the receiver-side home network as a stationary location proxy. The SIP server immediately retransmits the re-INVITE upon receiving a REGISTER message from the destination of a pending re-INVITE. This is similar to the solution for MIPv6 depicted in FIG. 11 with straightforward replacements of Mobile Host B's Home Agent with Mobile Host B's home network SIP server and binding update with re-INVITE. A difference is that in order to get the SIP server to be in the signaling path for the re-INVITE, the Record Route field can be used. No modifications are needed on the Mobile Hosts because SIP already has the Record Route feature. In MIPv6 the Mobile Hosts need to be modified to send control signaling information to the home address of the other node rather than directly to the care-of-address. The conversion of the SIP server to a pro-active one is in some ways easier than the conversion of the MIPv6 Home Agent to a pro-active forwarding proxy. This is because there is already the notion of stateful SIP servers that can retransmit messages like the re-INVITE if no acknowledgement has been received by the time a timer expires.

Additionally, if the home network SIP server is modified to become a pro-active redirecting location proxy, instead of a pro-active forwarding location proxy, then it will need to interact with a pro-active forwarding proxy closer to the sender in the signaling path. In particular for the case that there is a SIP server in each home network of each Mobile Host, there would be a need to have a pro-active forwarding proxy in the sender's home network. This is similar to the chosen solution for MIP-LR, were the two HLRs were used in this way. One difference with SIP is that the Record-Route feature would be needed to keep both SIP servers in the signaling path.

For SIP mobility, the home network SIP server already has stationary location proxy functionality and can take on the role of stationary binding update proxy for incoming INVITE messages. One solution is to have the SIP server immediately re-transmit the re-INVITE upon receiving a REGISTER message from the destination of a pending re-INVITE rather than waiting for a time-out. Upon receiving the REGISTER message, it knows that the previous re-INVITE it sent may have been lost. This addresses one of the problems of using timer based retransmissions discussed above.

Alternatively for the SIP solution retransmission based on timers can be used in combination with an "interceptor" function used in the previous network to intercept signaling and send to the correct location of the Mobile Host. This "interceptor" function would be parallel to the RTP translator function of forwarding RTP (data) traffic. The flow is similar to that of FIG. 9 except that re-INVITE is sent instead of INVITE.

Application to MIP-LR

Figure 12:
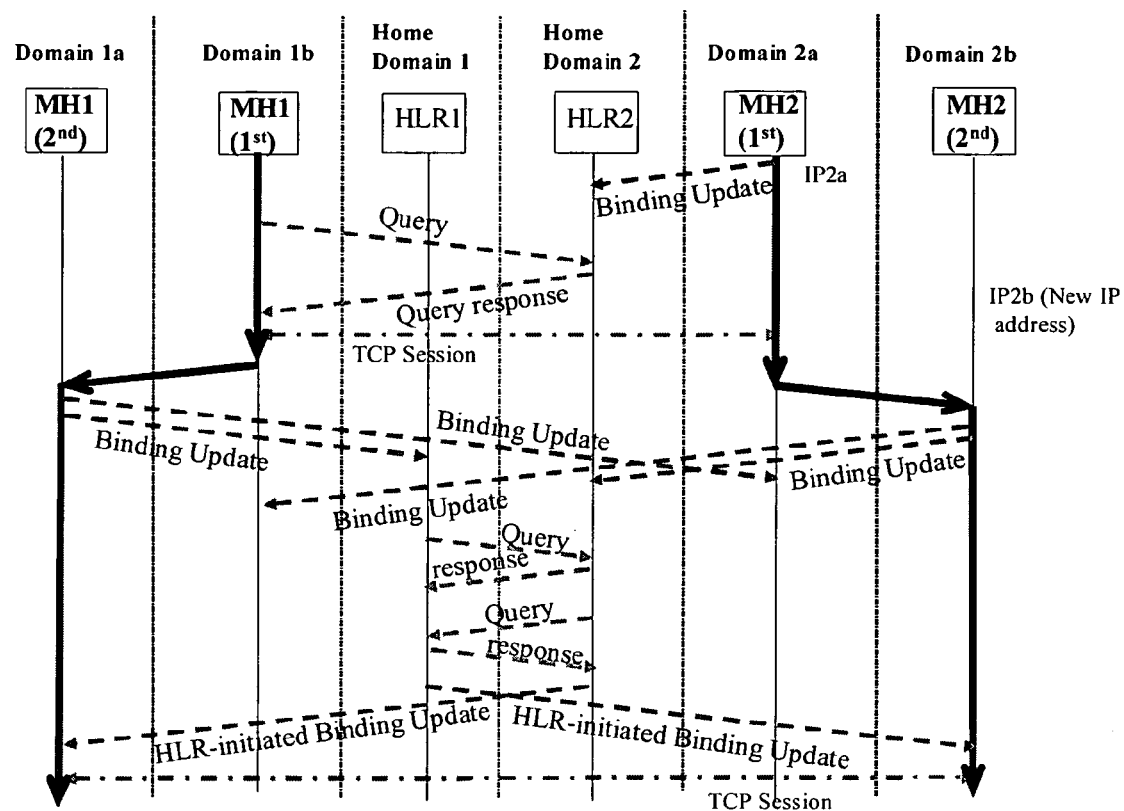
FIG. 12 is a diagram depicting the implementation of the present invention in a network using MIP-LR.
Figure 13:
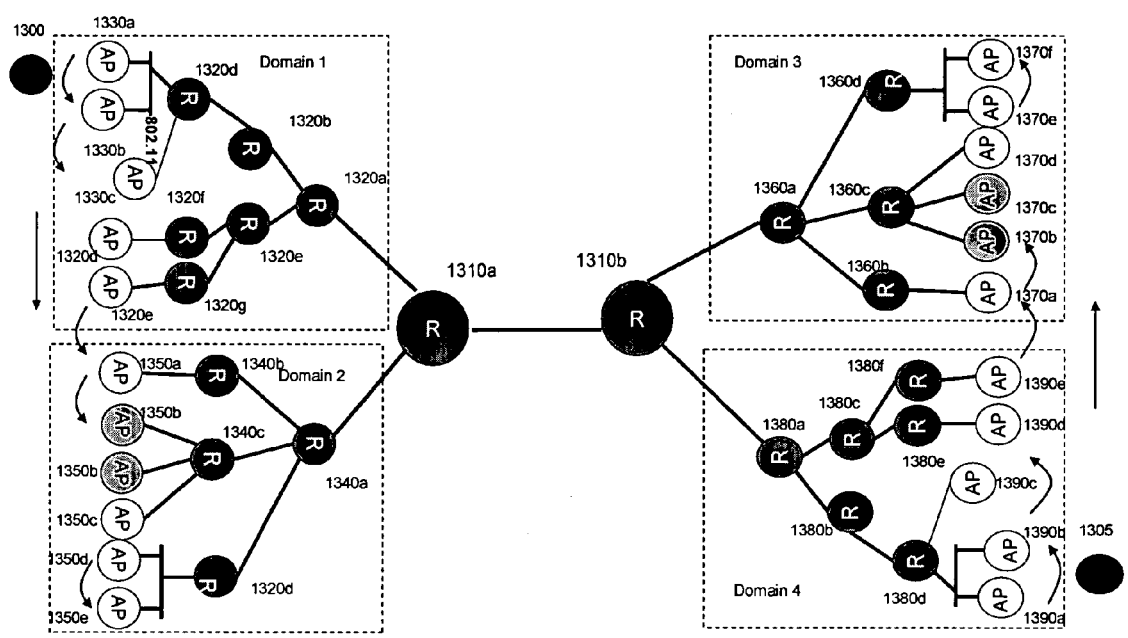
FIG. 13 is a diagram depicting the simultaneous mobility problem in an infrastructure-based network.

There are two varieties of MIP-LR: one with Foreign Agents and one without. The one without Foreign Agents uses Advertisement Agents. For the purposes of placement of the Interceptor function, it does not matter whether Foreign Agents or Advertisement Agents are in use. The important point is that there is some kind of agent in each of the foreign networks and the Interceptor function can be placed there. MIP-LR will need to be modified so that the Mobile Host sends a binding update to the Foreign Agent or Advertisement Agent in the previous subnet as soon as it obtains its new IP address. For this solution, the binding update sent by a Mobile Host to its HLR has a list of Correspondent Hosts and their addresses. The HLR, which already performs the role of redirecting a location proxy, is enhanced to be a pro-active redirecting location proxy. It also act as a proactive binding update proxy, since it anyway obtains the current binding information as part of MIP-LR updating after each handoff. In order to do this, the HLRs must be enhances to proactively retransmit binding updates and to query other HLRs for addresses of Correspondent Hosts. In order to minimize the change to the MIP-LR protocol, the HLR-initiated binding updates are only sent when necessary, i.e., when the queries return a newer address for a Correspondent Host than the one provided by the Mobile Host. FIG. 12 depicts this solution.

Figure 1:
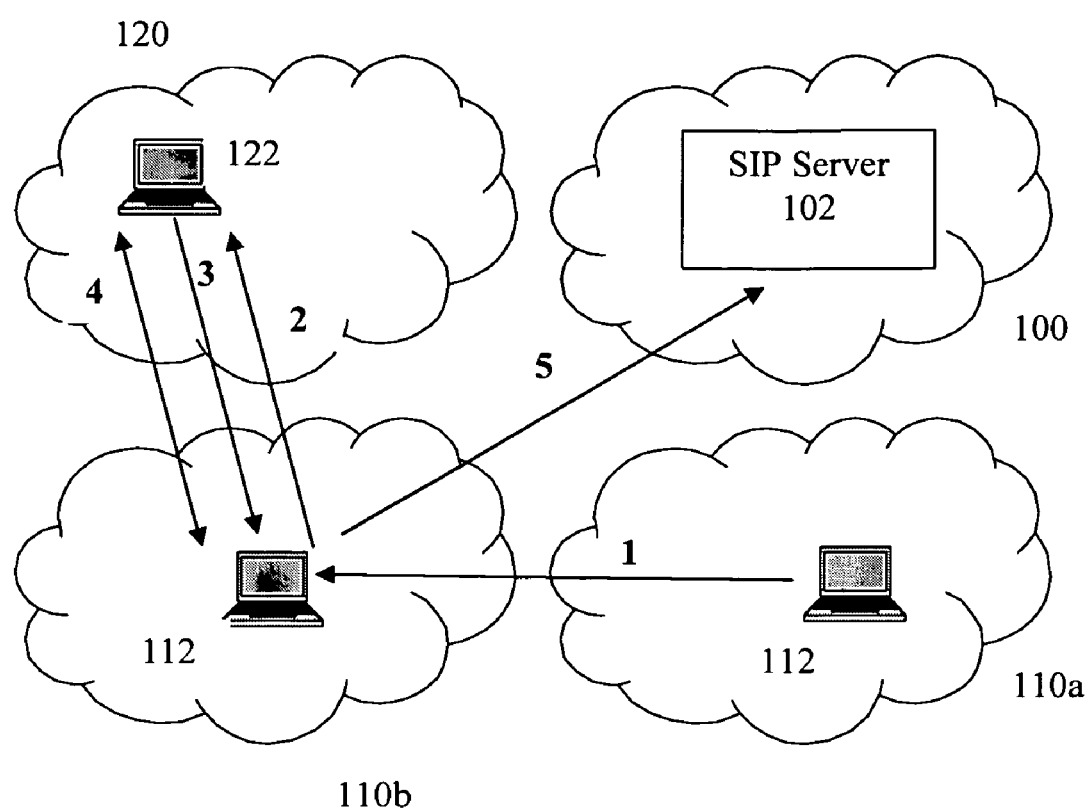
FIG. 1 depicts the movement of a Mobile Host from one foreign network to another in a Session Initiation Protocol (SIP) environment.
Figure 2:
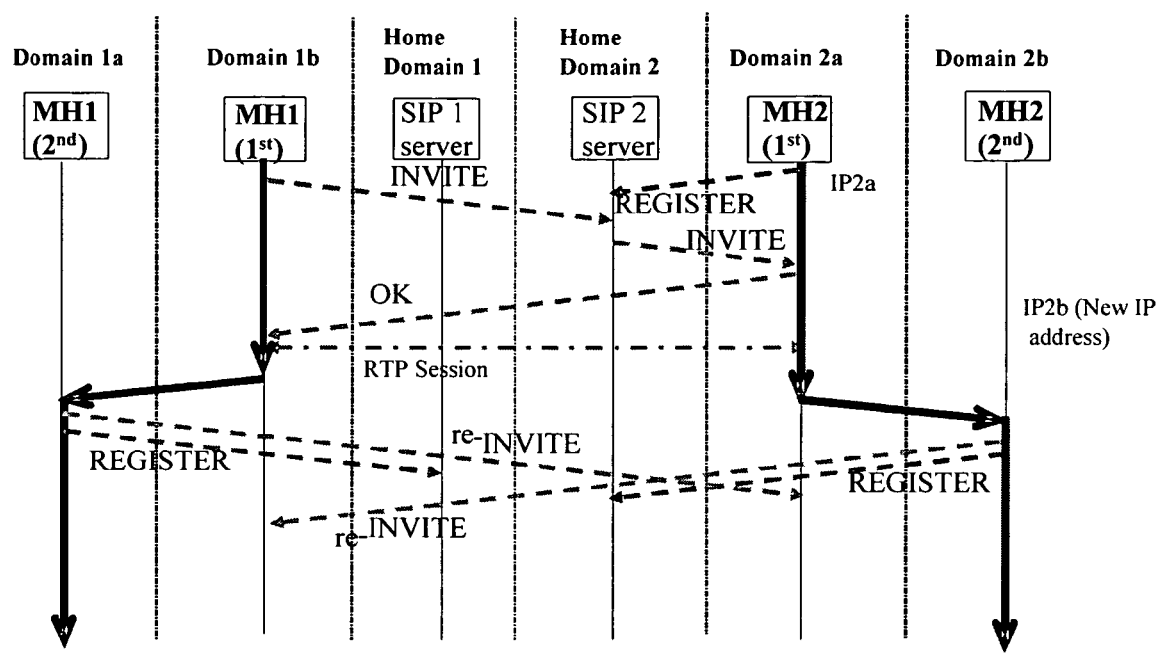
FIG. 2 is a diagram depicting the flow of data resulting from a mishandling of simultaneous mobility in a SIP environment.
Figure 3:
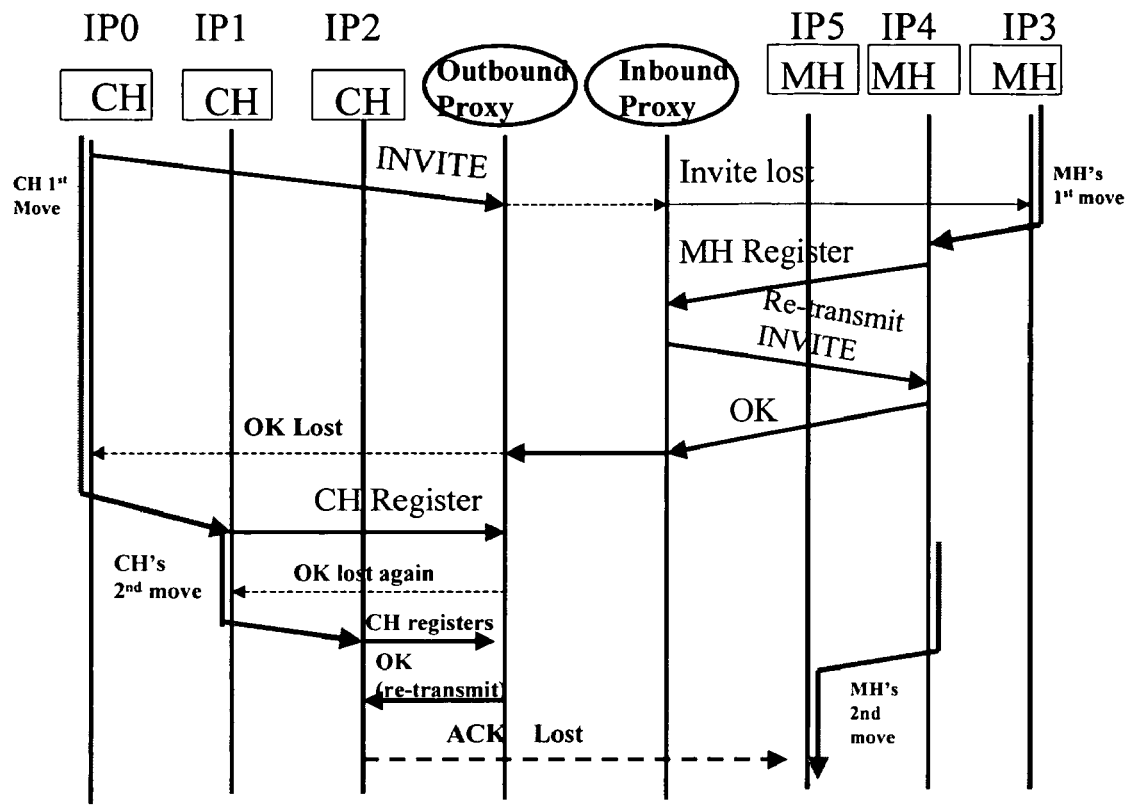
FIG. 3 is a diagram depicting the flow of data resulting from the simultaneous mobility problem in pre-session SIP.
Figure 4:
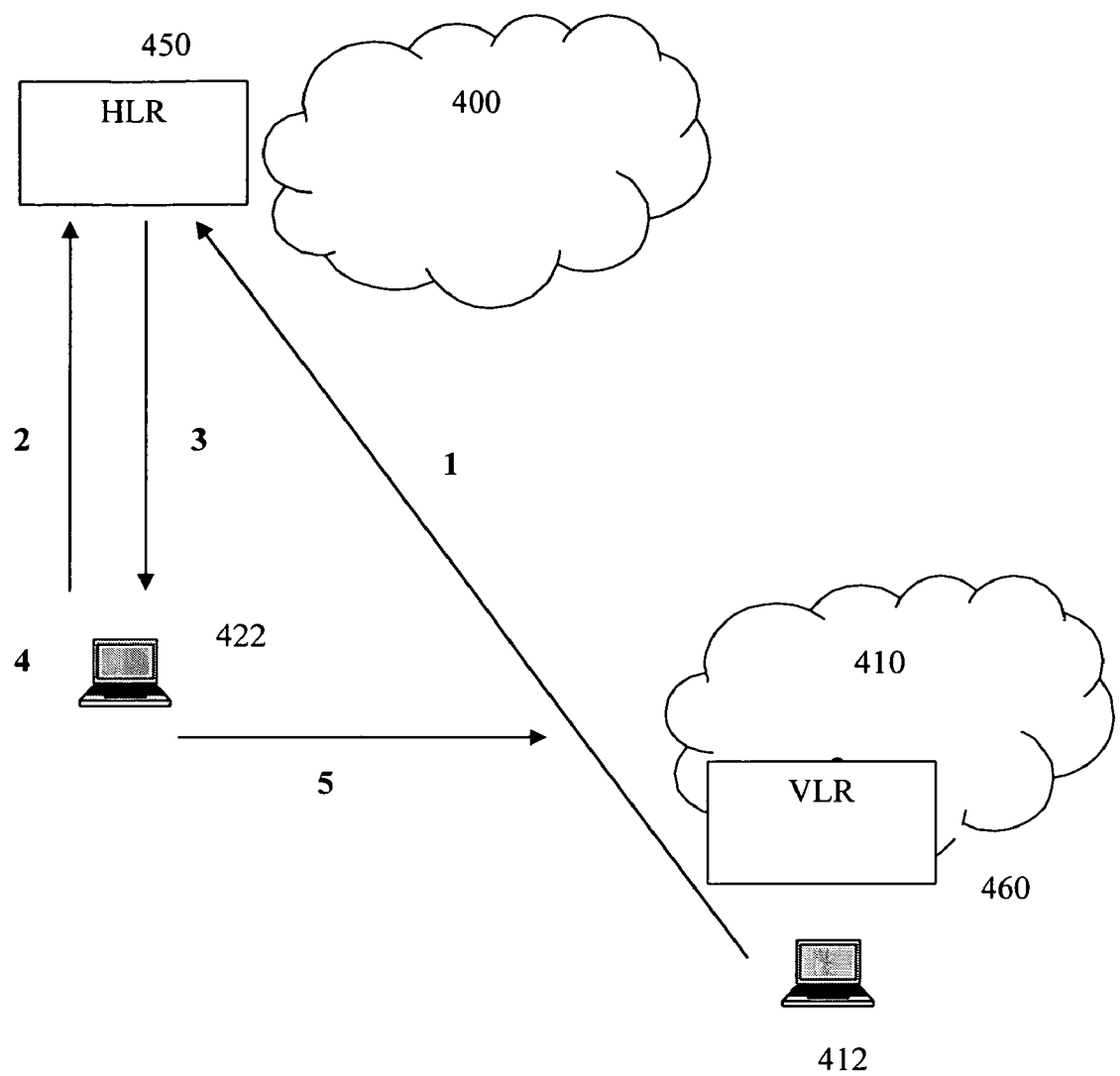
FIG. 4 is a diagram depicting mobility of a Mobile Host in a network employing MIP-LR.
Figure 5:
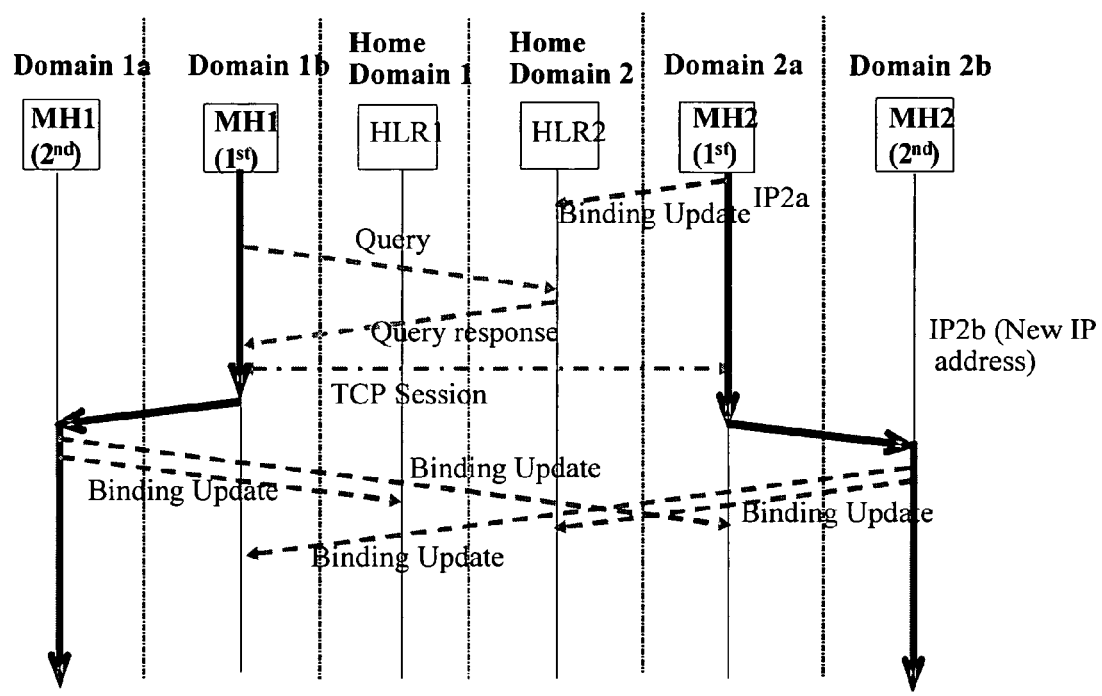
FIG. 5 is a diagram depicting the flow of data resulting from simultaneous mobility in a network implementing MIP-LR.
Figure 6:
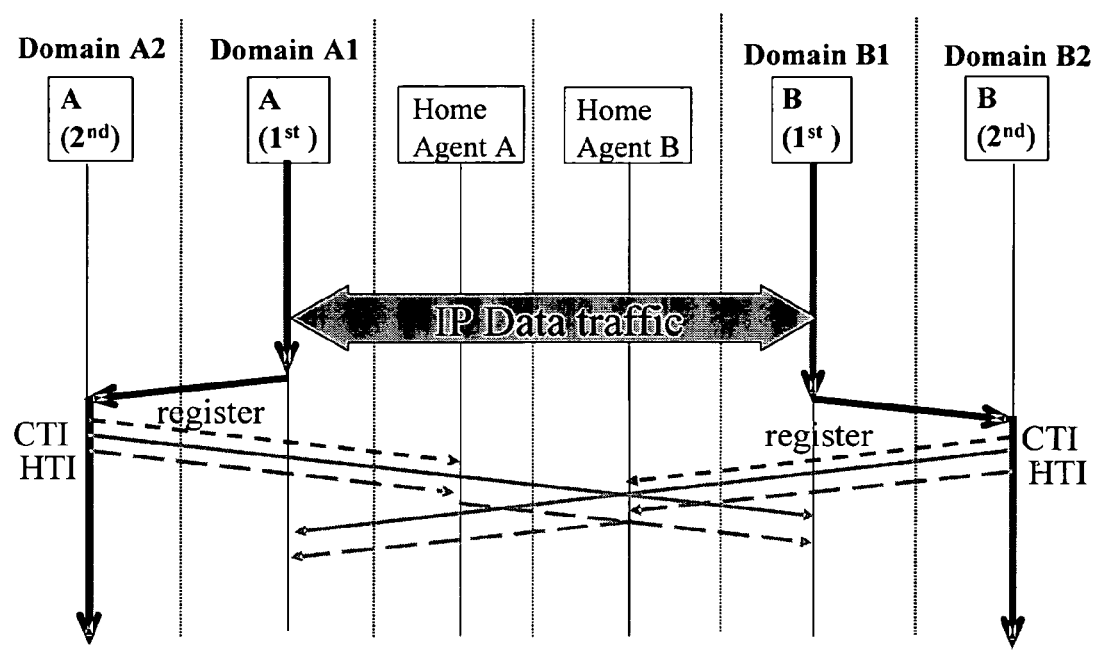
FIG. 6 is a diagram depicting one instance of the simultaneous mobility problem in a network employing MIPv6.
Figure 7:
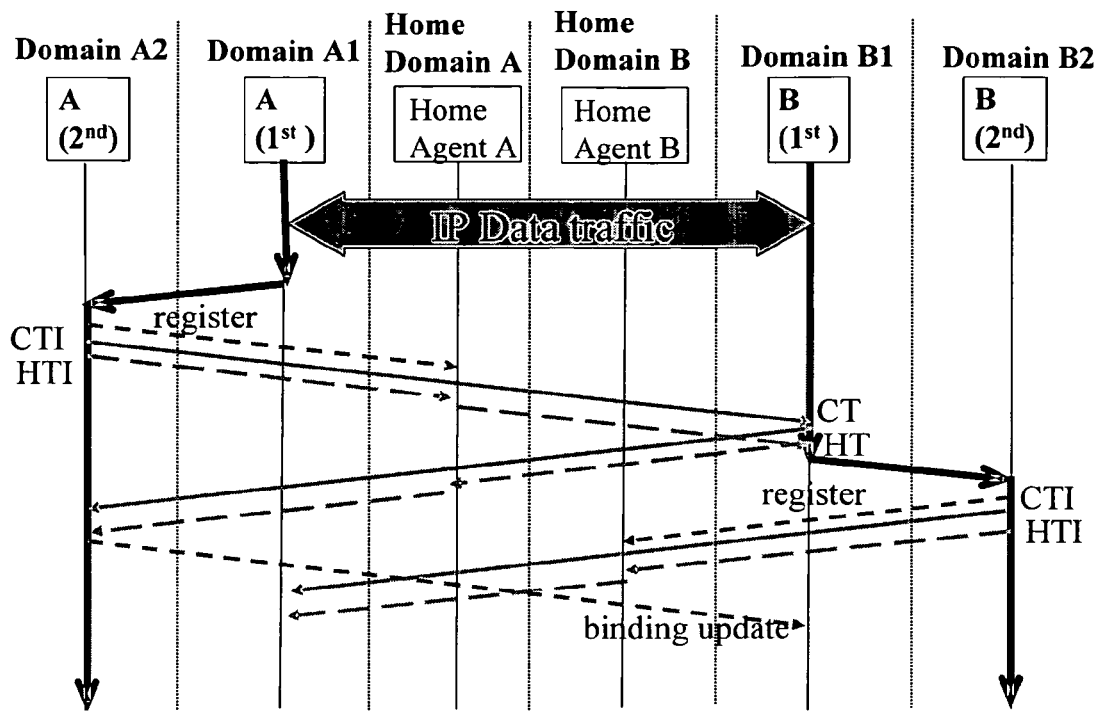
FIG. 7 is a diagram depicting a second instance of the simultaneous mobility problem in a network employing MIPv6.

Illustrating the present invention using MIP-LR, the HLR already performs the role of stationary location proxy and may be enhanced to also act as the stationary binding update proxy since it already obtains the current binding information as part of MIP-LR updating after each handoff. FIG. 12 depicts the flow as being similar to FIG. 5 except that now the binding update sent by a Mobile Host to its HLR also contains a list of Correspondent Hosts, and the HLRs are enhanced. Note that the HLR-initiated binding updates are new. Sending these updates is part of the stationary binding update proxy functionality added to the HLR. Although the direct binding updates are lost, as in FIG. 5, the HLR-initiated binding updates arrive at the correct destinations. In a special case, a HLR queries another HLR for the location of a Mobile Host just before the binding update arrives. In this case, it is desirable that the queried HLR sends a revised response without the querying HLR having to query again. Therefore, the HLRs should treat these HLR-to-HLR queries differently from normal queries, and be prepared to revise their response, if updated bindings are available, for some period of time after receiving a query.

Application to MIPv6

The above discussion has presented the generalized solution for the simultaneous mobility problem as applied it to SIP mobility and Mobile IP with Location Register. The solution introduced two abstract concepts, namely "stationary binding update proxies" and "stationary location proxies." Each Mobile Host has both these proxies. The stationary binding update proxy is responsible for obtaining the latest location of the Mobile Host's Corresponding Host. The stationary binding proxy has an advantage over the Mobile Host in doing this, in that it is at a fixed location. The stationary location proxy, on the other hand, is the dual of the stationary binding update proxy. It is responsible for maintaining the latest location of the Mobile Host itself, and delivering such information to the Mobile Host's Corresponding Host (or the stationary binding update proxies of the Mobile Host's Corresponding Host). The stationary proxies are abstract in the sense that they need not be separate network elements, but are roles that can be assumed by existing network elements.

The generalized solution was designed for mobility protocols where the process of informing the Corresponding Host of a new IP address was simply through the sending of an update message, e.g., SIP re-INVITE or MIP-LR registration. This is simpler than with MIPv6, which requires a return routability procedure before the binding update can be sent. Furthermore, to be effective, it needs the stationary binding update proxy to be able to pro-actively issue binding updates to Corresponding Host as soon as it obtains the latest location information from the Corresponding Host's stationary location proxies. In the case of MIPv6, the binding update must be authenticated, so we cannot simply put the stationary binding update proxy at the home agent and expect it to send home agent-initiated binding updates to Corresponding Hosts.

Figure 10:
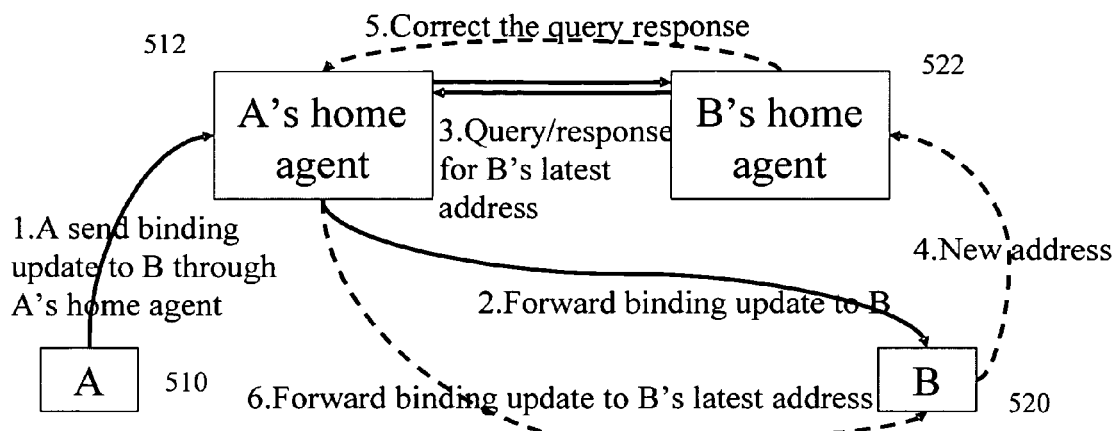
FIG. 10 is a diagram of a first embodiment of the present invention in a network using MIPv6.

Thus, in order to use stationary location proxies and stationary binding update proxies with MIPv6, additional modifications are needed to MIPv6. For example, as shown in FIG. 10, Mobile Host A 510 may need to send its Care-of Test Init (or binding update later) to Mobile Host B 520 through Mobile Host A's home agent 512 (step 1). Mobile Host A's home agent 512 forwards the message to Mobile Host B (step 2), but keeps a copy of it for a short time, $T_h$. Mobile Host A's home agent 512, acting as Mobile Host A's stationary binding update proxy, then queries Mobile Host B's home agent 522 (which is Mobile Host B's stationary location proxy). Mobile Host B's home agent 522 sends Mobile Host A's home agent the latest address it has for Mobile Host B, and waits for a short time, $T_p$. There are two cases; case (a): during this waiting period, Mobile Host B 520 registers a new care-of-address with Mobile Host B's home agent 522 (optional step 4). Acting like the faithful stationary location proxy that it is, Mobile Host B's home agent 522 updates Mobile Host A's home agent 512 with the latest care-of-address (optional step 5); case (b): during the waiting period, Mobile Host B's home agent 522 receives no new updates from Mobile Host B 520. In either case, Mobile Host A's home agent then has Mobile Host B's latest address, and if it is new, it can send to that address the message that it had kept (optional step 6; of course, the destination address would be changed to the new address).

A second solution is even more efficient. When Mobile Host A is trying to send an update to Mobile Host B, Mobile Host A's home agent can be Mobile Host A's stationary binding update proxy for query Mobile Host B's home agent (which acts as Mobile Host B's stationary location proxy) for Mobile Host B's location. However, the query/response functionality that would be added would be a significant addition to home agent functionality. In their normal operations, home agents are not queried for the location of Mobile Hosts they serve—they only forward packets to the latest known address of those Mobile Hosts. Thus, in this section, the solution is more MIPv6-centric and does not involve query/response messages between home agents.

Unlike the solution with stationary proxies, Mobile Host A's home agent does not have to be involved. Mobile Host A sends control messages directly to Mobile Host B's home address (not care-of address, which may be out-dated in the case of simultaneous mobility). The home test init, care-of test init and binding update messages would be the affected messages. This is step 1 in FIG. 11, which shows binding update, but the same applies also to home test init and care-of test init. Thus, Mobile Host B's home agent 522 will take care of forwarding the binding update to Mobile Host B 520; this is the Mobile Host B home agent's normal function (step 2). However, it is possible that Mobile Host B 520 may move before the binding update arrives. Mobile Host B 520 then updates its home agent 522 with its new address (step 3, part of the normal operation of an Mobile Host). The difference from regular MIPv6 is in step 4, where Mobile Host B's home agent re-forwards Mobile Host A's binding update, this time to the latest location of Mobile Host B. This smart re-forwarding does away with the simultaneous mobility problem.

Certain modifications to the home agent employed in MIPv6 are necessary. It would need to not just blindly forward all traffic from Corresponding Hosts to Mobile Host B, but to scan the traffic for binding updates. Whenever a control message (binding update, home test init or care-of test init) arrives, the home agent keeps a temporary copy of it for a short period of time, $T_b$, after which it is discarded. The identity of the target node (B, in this case), is also stored. Whenever a binding update arrives at the home agent from one of its own Mobile Hosts like B, it checks if there are any control messages in temporary storage that are destined for Mobile Host B. If there are any (e.g., from Mobile Host A), then they can be forwarded (step 4). An appropriate value for $T_b$ must be determined. It should clearly be large enough to take care of the following case: Mobile Host A moves first, and the control message reaches almost all the way to Mobile Host B's care-of address before Mobile Host B moves; Mobile Host B then obtains a new care-of-address at its new location and sends a binding update to its home agent. Thus, $T_b$ should take into account the two-way latency from Mobile Host B's home agent to Mobile Host B, plus the time for Mobile Host B to move and obtain a new care-of address.

Modifications to the Mobile Hosts are necessary. For control signaling only, where the messages (home test init, care-of test init, and binding update) would be sent to the last-known care-of address, they would be sent to the home address. Thus, a slight disadvantage is a possible minor increase in latency in the control signaling only.

Supposing only one of the two home agents implements this solution, it will still be useful. For example, if only Mobile Host A's home agent implements this feature, Mobile Host B's binding updates will always reach Mobile Host A correctly. Mobile Host A can then resend its own binding update to Mobile Host B's latest address, so both nodes will have the correct latest addresses.

Corresponding Hosts do not have to know the current address of an Mobile Host; the Mobile Host's home agent will take care of the forwarding. The only problem is the small interval when the home agent does not yet have the latest care-of address of the Mobile Host. With just a slight modification to the home agent to deal with that problem, the stationary binding update proxy becomes unnecessary.

The above-described embodiments of our invention are intended to be illustrative only. Numerous other embodiments may be devised by those skilled in the art without departing from the spirit and scope of our invention.

We claim:

1. A method for maintaining a communication session in which data is exchanged between a first mobile host connected to a first attachment point an infrastructure-based network and at least a second mobile host connected to a second attachment point in the network as the first mobile host moves from said first attachment point to a third attachment point and the second mobile host moves from said second attachment point to a fourth attachment point comprising the steps of:

sending a binding update from the first mobile host to a first stationary location proxy associated with said first mobile host;

sending a list of all hosts in communication with the first mobile host and the binding update from the first mobile host to a first stationary binding update proxy associated with the first mobile host;

sending a binding update from the second mobile host to a second stationary location proxy associated with said second mobile host;

sending a list of all hosts in communication with the second mobile host and the binding update from the second mobile host to a second stationary binding update proxy associated with the second mobile host;

obtaining the IP address of the first and second mobile hosts at the stationary binding update proxy of each from the stationary location proxy of the other mobile host.

2. The method of claim 1 further comprising the step of sending the direct binding updates from the first mobile host to the last known IP address of each host in communication with the first mobile host.

3. The method of claim 1 further comprising intercepting packets destined for the first mobile host that arrive in the sub-net for the first attachment point from which the first mobile host has moved and forwarding these packets to the sub-net for the third attachment point to which the first mobile host has moved.

4. The method of claim 3 wherein the step of intercepting in a MIP-LR network is performed by the Foreign Agent or Advertisement Agent.

5. The method of claim 1 further comprising intercepting packets destined for the second mobile host that arrive in the sub-net for the second attachment point from which the second mobile host has moved and forwarding these packets to the sub-net for the fourth attachment point to which the second mobile host has moved.

6. The method of claim 1 wherein the communication session is established using Session Initiation Protocol (SIP).

7. The method of claim 6 wherein the SIP server for the first mobile host functions as the stationary location proxy and as the stationary binding update proxy for incoming INVITE messages.

8. The method of claim 6 wherein the SIP server immediately re-transmits re-INVITE messages upon receiving a REGISTER message from the destination of a pending re-INVITE message rather than waiting for a time-out.

9. The method of claim 1 wherein the communication session is established using Mobile Internet Protocol with Location Registers (MIP-LR).

10. The method of claim 9 wherein the Home Location Register (HLR) functions as the stationary location proxy and the stationary binding update proxy.

11. The method of claim 1 wherein the communication session is established using Mobile Internet Protocol version 6 (MIPv6).

12. The method of claim 11 wherein the home agent of the each of the first and second mobile hosts functions as the stationary location proxy and the stationary binding update proxy for each mobile host respectively.

13. The method of claim 12 wherein data from the first mobile host to the second mobile host is scanned to detect binding updates and whenever a control message (binding update, home test init or care-of test init) is identified the home agent retains a copy for a time predetermined time period after which time the copy is discarded.

14. The method of claim 13 further comprising the step of checking for stored control messages when a binding update arrives at the home agent of a mobile host and forwarding any such stored control messages to the mobile host.

15. The method of claim 13 wherein the predetermined time period is longer than the two-way time latency from the home agent to the mobile host and the time latency for the mobile host to move and obtain a new care-of address.

* * * * *

UNITED STATES PATENT AND TRADEMARK OFFICE
CERTIFICATE OF CORRECTION

| | | |
|---|---|---|
| PATENT NO. | : 7,319,689 B2 | Page 1 of 1 |
| APPLICATION NO. | : 11/248743 | |
| DATED | : January 15, 2008 | |
| INVENTOR(S) | : Dutta et al. | |

It is certified that error appears in the above-identified patent and that said Letters Patent is hereby corrected as shown below:

On the Title Page, Item (57), under "ABSTRACT", in Column 2, in Line 21, delete "each the" and insert -- each of the --, therefor.

In the Specification

In Column 6, Line 49, delete "an Mobile" and insert -- a Mobile --, therefor at each occurrence throughout the Specification.

In Column 10, Line 27, delete "a units" and insert -- α units --, therefor.

In Column 10, Line 39, delete "at lest" and insert -- at least --, therefor.

Signed and Sealed this
Eleventh Day of November, 2014

Michelle K. Lee
*Deputy Director of the United States Patent and Trademark Office*